(12) United States Patent
Lesartre et al.

(10) Patent No.: US 10,817,361 B2
(45) Date of Patent: Oct. 27, 2020

(54) CONTROLLING ERROR PROPAGATION DUE TO FAULT IN COMPUTING NODE OF A DISTRIBUTED COMPUTING SYSTEM

(71) Applicant: HEWLETT PACKARD ENTERPRISE DEVELOPMENT LP, Houston, TX (US)

(72) Inventors: Gregg B Lesartre, Fort Collins, CO (US); Dale C Morris, Steamboat Springs, CO (US); Russ W Herrell, Fort Collins, CO (US); Blaine D Gaither, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 29 days.

(21) Appl. No.: 15/973,527

(22) Filed: May 7, 2018

(65) Prior Publication Data

US 2019/0340053 A1 Nov. 7, 2019

(51) Int. Cl.
*G06F 11/07* (2006.01)
*H04L 12/24* (2006.01)

(52) U.S. Cl.
CPC ...... *G06F 11/0751* (2013.01); *G06F 11/0709* (2013.01); *G06F 11/0772* (2013.01); *G06F 11/0781* (2013.01); *H04L 41/0659* (2013.01); *G06F 11/0793* (2013.01)

(58) Field of Classification Search
CPC .............. G06F 11/0772; G06F 11/0751; G06F 11/0793; G06F 11/0781; G06F 11/0709; H04L 45/00; H04L 45/28; H04L 45/22
See application file for complete search history.

(56) References Cited

U.S. PATENT DOCUMENTS

| | | | |
|---|---|---|---|
| 6,081,876 A | 6/2000 | Brewer et al. | |
| 6,233,702 B1* | 5/2001 | Horst ............... | G01R 31/31727 711/E12.026 |
| 6,434,568 B1 | 8/2002 | Bowman-Amuah | |

(Continued)

FOREIGN PATENT DOCUMENTS

| | | |
|---|---|---|
| CN | 1610312 | 4/2005 |
| CN | 101030901 | 9/2007 |

(Continued)

OTHER PUBLICATIONS

Chapin, J. et al.; "Hive: Fault Containment for Shared-memory Multiprocessors"; http://citeseerx.ist.psu.edu/viewdoc/summary?doi. 10.1.1.133.1847 > on pp. 12-25; vol. 29; Issue: ; Dec. 3, 1995.

(Continued)

*Primary Examiner* — Nadeem Iqbal
(74) *Attorney, Agent, or Firm* — Hewlett Packard Enterprise Patent Department

(57) ABSTRACT

A technique includes receiving an alert indicator in a distributed computer system that includes a plurality of computing nodes coupled together by cluster interconnection fabric. The alert indicator indicates detection of a fault in a first computing node of the plurality of computing nodes. The technique indicates regulating communication between the first computing node and at least one of the other computing nodes in response to the alert indicator to contain error propagation due to the fault within the first computing node.

19 Claims, 6 Drawing Sheets

(56) References Cited

U.S. PATENT DOCUMENTS

| | | | |
|---|---|---|---|
| 6,918,059 B1* | 7/2005 | Galuten | G06F 11/0715 |
| | | | 714/31 |
| 7,243,257 B2 | 7/2007 | Kawaguchi | |
| 7,475,274 B2* | 1/2009 | Davidson | G06F 11/1438 |
| | | | 714/2 |
| 7,551,552 B2* | 6/2009 | Dunagan | G06F 11/0709 |
| | | | 370/221 |
| 7,640,339 B1 | 12/2009 | Caronni et al. | |
| 7,793,051 B1 | 9/2010 | Nguyen et al. | |
| 7,904,751 B2 | 3/2011 | Marisety et al. | |
| 8,055,945 B2* | 11/2011 | Compton | G06F 11/0709 |
| | | | 714/26 |
| 8,260,956 B2* | 9/2012 | Reyhner | G06F 9/546 |
| | | | 709/223 |
| 8,527,622 B2* | 9/2013 | Moreira Sa de Souza | |
| | | | H04L 41/0636 |
| | | | 709/223 |
| 8,904,117 B1* | 12/2014 | Kalekar | G06F 12/0804 |
| | | | 711/119 |
| 9,274,902 B1 | 3/2016 | Morley et al. | |
| 9,990,244 B2* | 6/2018 | Lesartre | G06F 11/0793 |
| 2002/0194319 A1 | 12/2002 | Ritche | |
| 2003/0163768 A1 | 8/2003 | Dawkins et al. | |
| 2004/0216003 A1 | 10/2004 | Floyd et al. | |
| 2010/0306573 A1 | 12/2010 | Gupta | |

FOREIGN PATENT DOCUMENTS

| | | |
|---|---|---|
| EP | 0666667 | 8/1995 |
| EP | 0666667 A2 | 8/1995 |
| JP | 2007-280155 | 10/2007 |
| JP | 2010-238150 | 10/2010 |
| JP | H10-326261 | 12/2010 |
| WO | WO2000/065448 | 11/2000 |
| WO | WO-0065448 | 11/2000 |

OTHER PUBLICATIONS

Extended European Search Report, 13873972.7-1951/2951706; PCT/US2013023810; dated Sep. 8, 2016, 7 pages.

Chapin, J.; Hive: Fault Containment for Shared-memory Multiprocessors; Dec. 3, 1995 http://citeseerx.ist.psu.edu/viewdoc/summary?doi=10.1.1.133.1847 > on pp. 12-25.

PCT/ISA/KR, International Search Report, dated Oct. 25, 2013, PCT/US2013/023810, 11 pps.

* cited by examiner

CONTROLLING ERROR PROPAGATION DUE TO FAULT IN COMPUTING NODE OF A DISTRIBUTED COMPUTING SYSTEM

BACKGROUND

A computer system has traditionally contained both volatile and non-volatile memory devices. In this manner, due to their relatively faster access times, volatile memory devices, such as dynamic random access memory (DRAM) devices, have typically been used to form the working memory for the computer system. To preserve computer system data when the system is powered off, data may be stored in non-volatile mass storage devices associated with slower access times, such as magnetic media or optical media based mass storage devices.

The development of relatively high density solid state persistent memory technologies is closing the gap between the two technologies; and as such, the amount of persistent, byte-addressable "memory," which serves both traditional "memory" and "storage" functions is being ever increasingly used. Due to growing use of this memory, distributed computing systems are expected to become increasingly more common. With a distributed computing system, computing nodes typically are coupled together with cluster fabric (network fabric, for example) for purposes of sharing, or pooling, memory and storage resources of the nodes.

DETAILED DESCRIPTION

Figure 1:
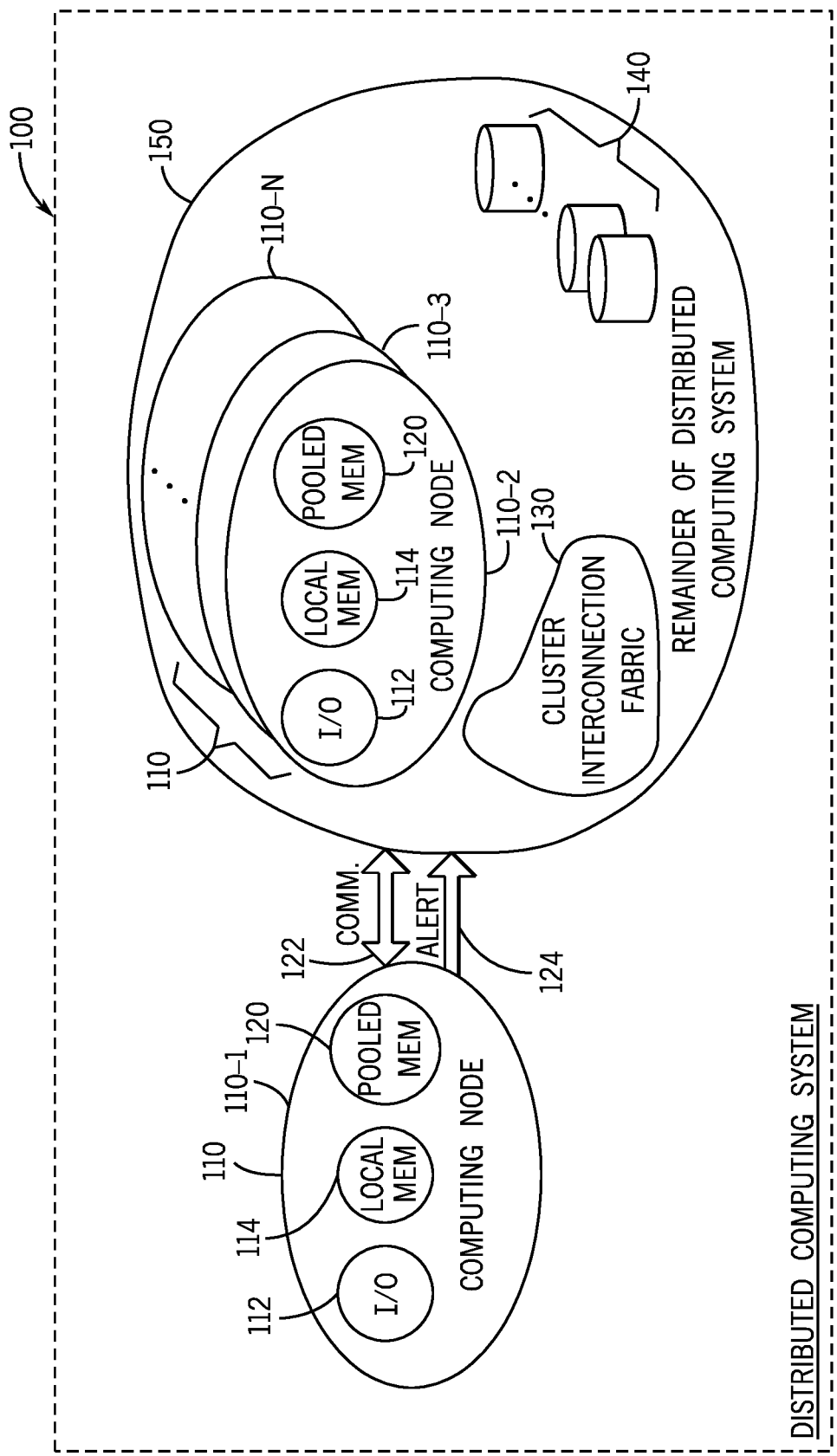
FIG. 1 is a schematic diagram of a distributed computing system according to an example implementation.

Referring to FIG. 1, an exemplary distributed computing system 100 includes N computing nodes 110 (computing nodes 110-1, 110-2 . . . 110-N, being depicted in FIG. 1 as examples). The computing node 110, in general, includes resources, which may form local resources for the node 110, as well as resources that are shared, or pooled, among the computing nodes 110. In this manner, the distributed computing system 100 may include pools of memory and input/output (I/O) resources, which are shared among different groups of computing nodes 110.

As a more specific example, the computing node 110-1 may include an I/O adaptor 112, which may be used by the computing node 110-1, as well as may be accessed by other computing nodes 110. In this manner, the I/O adaptor 112 may be a Small Computer System Interface (SCSI)-based adaptor, Fiber Channel Adaptor or other I/O adapter, which may be used to access one or more mass storage devices 140 (that may be part of or separate from the computer node 110-1). The computing node 110-1 may further include memory devices (dynamic random access memory (DRAM) devices and/or solid state memory devices, as examples), which may form local memory 114 for the computing node 110-1, as well as pooled memory 120, which is shared by other computing nodes 110. Other computing nodes 110 of the distributed computing system 100 may have similar local and/or pooled resources.

For purposes of accessing the pooled resources, the computing nodes 110 may communicate over system fabric, called "cluster interconnection fabric 130" herein. As example, the cluster interconnection fabric 130 may include Internet-based connection fabric, local area network (LAN) connection-based fabric, wide area network (WAN) connection-based fabric, and so forth, as can be appreciated by the skilled artisan.

During its normal course of operation, a given computing node 110, such as the computing node 110-1, may experience a hardware or software error, which results in a fault occurring within the domain of the computing node 110-1. The fault may arise due to a hardware failure (failure of an I/O adaptor 112, network interface, memory device, and so forth), as well as a software failure due to a programming error in system firmware, an operating system error, and so forth. Regardless of the source of the fault, when such a fault occurs, the computing node 110-1 may have resources (memory content, for example), which may be corrupted or become corrupted upon further operation of the computing node 110-1.

One approach to handle a fault occurring within a given computing node is to completely isolate the computing node so that errors do not propagate outside of the node and affect other computing entities. For example, one approach may be to shut down a computing node that experiences a fault so that the node may be taken offline for purposes of correcting the cause of the fault and preventing other computing entities from becoming corrupted. Although traditionally, the fault domain of a particular computing entity resides within the entity itself so that errors resulting from this fault do not propagate outside of the entity, unlike traditional arrangements, the distributed computing system 100 has pooled I/O and memory resources that are shared among its computing nodes 110.

Therefore, for example, when the computing node 110-1 experience a fault, one or multiple other computing nodes 110 may be directly affected due to pooled resource(s) that are located on the node 110-1. Moreover, the computing node 110-1 accesses pooled resources outside of the computing node 110-1, such as I/O adapters 112, pooled memories 120, and so forth, from other computing nodes 110 of the distributed computing system 100. Thus, the effective fault domain extends outside of the computing node 110-1 where the fault arises and into other regions of the distributed computing system 100.

Techniques and systems are disclosed herein for purposes of controlling the propagation of errors due to a fault occurring in a computing node 110 of a distributed computing system 100. Continuing to use the computing node 110-1 as an example, assuming that a fault occurs in connection with the computing node 110-1, the computing node 110-1, in accordance with an example implementation, generates an alert indicator 124. This alert indicator 124, in turn, is used for purposes of triggering actions by one or more components of the distributed computing system 100 for purposes of confining errors (that arise due to the fault occurring with the computing node 110-1) within the computing node 110-1.

More specifically, in accordance with example implementations, the alert indicator 124 is received by a remainder 150 of the distributed computing system 100 so that the remainder 150 may take the appropriate actions to contain errors within the computing node 110-1. It is noted that the specific technique that is used by the computing node 110-1 to detect a fault may be one of the several fault detection techniques, as can be appreciated by the skilled artisan.

Figure 2:
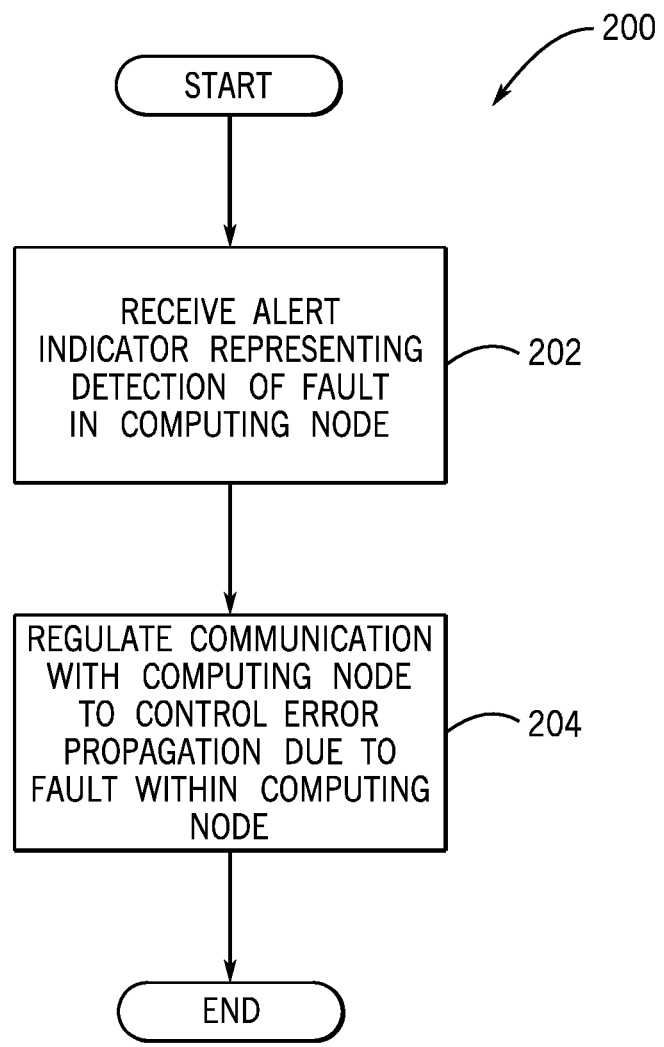
FIG. 2 is a flow diagram depicting a technique to control error propagation in a distributed computing system due to a computing node fault according to an example implementation.

Referring to FIG. 2 in conjunction with FIG. 1, as a more specific example, in accordance some implementations, a technique 200 may be employed for purposes of error propagation containment in a distributing computing system in which resources are shared. Pursuant to the technique 200, an alert indicator is received (block 202), which represents detection of a fault by a computing node of the distributed computing system. In response to this alert indicator, communications with the computing node are regulated, pursuant to block 204, to control error propagation due to the fault.

Figure 3:
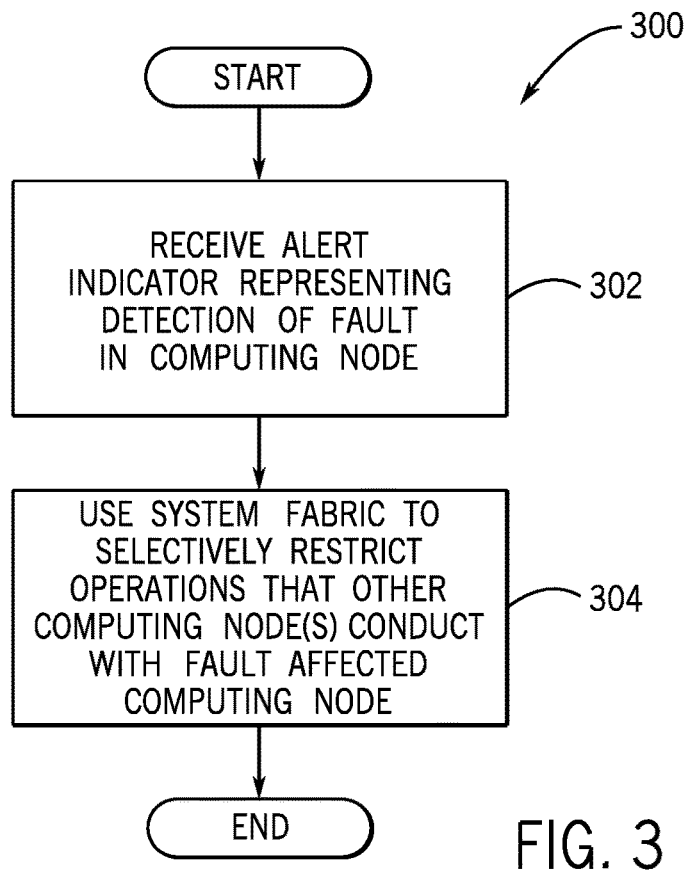
FIGS. 3 and 4 are flow diagrams depicting techniques to control error propagation in a distributed computing system due to a computing node fault according to example implementations.

As a more specific example, referring to FIG. 3, in conjunction with FIG. 1, in accordance with some implementations, a technique 300 may be employed by the cluster interconnection fabric 130 of the distributed computing system 100 for purposes controlling the propagation of errors due to a fault occurring in a given computing node. Pursuant to the technique 300, an alert indicator is received (block 302), which represents detection of a fault by a computing node (herein called the "affected computing node"). In response to the alert indicator, the cluster interconnection fabric 130 is used (block 304) to selectively restrict operations that the other computing node(s) may conduct with the affected computing node.

In this manner, in accordance with example implementations, when a particular computing node 110 suffers a fault, outbound I/O communications from the affected computing node 110 are halted to prevent inbound, or in-progress, I/O communication to the node 110 from reading corrupted memory content of the affected node 110 and communicating this corrupted memory content to another device outside of the node 110, which is not knowledgeable about the corruption. Therefore, in accordance with some implementations, the cluster interconnection fabric 130 restricts, or limits, transactions over the fabric 130, to transactions that are directed to stopping, or halting the current I/O transactions with the affected computing node 110.

In accordance with example implementations, the affected computing node 110 that has experienced a fault may communicate such commands to stop or halt I/O transactions to all remote I/O adapters that are provisioned to the affected node 110; and consequently, the cluster interconnection fabric 130 allows these commands to be communicated. In further example implementations, the cluster interconnection fabric 130 may communicate such commands to stop or halt I/O transactions on behalf of the affected computing node 110 that experienced the fault to all remote I/O adapters provisioned to the affected node 110 immediately upon receiving the alert indicator 124. Thus, many variations are contemplated, which are within the scope of the appended claims.

As further disclosed herein, in addition to allowing the affected computing node 110 that to communicate commands to stop or halt I/O transactions, in accordance with further implementations described below, the cluster interconnection fabric further permits the computing node 110 experiencing the fault to communicate cached data to one or multiple other computer nodes 110 for purposes of allowing failure analysis to be performed using this cached data.

After the computing node has indicated that it has incurred a failure, the fabric 130 may subsequently disavow a number of types of accesses that the computing node may attempt to make. For example, the computing node may not be allowed to encache new portions of remote memory in its caches or only encache locations necessary to execute data collection sequences. The computing node may not be allowed to provision additional memory and/or I/O resources to itself. Moreover, the computing node may not be allowed to send commands to remote I/O adapters other than the stop command.

Figure 4:
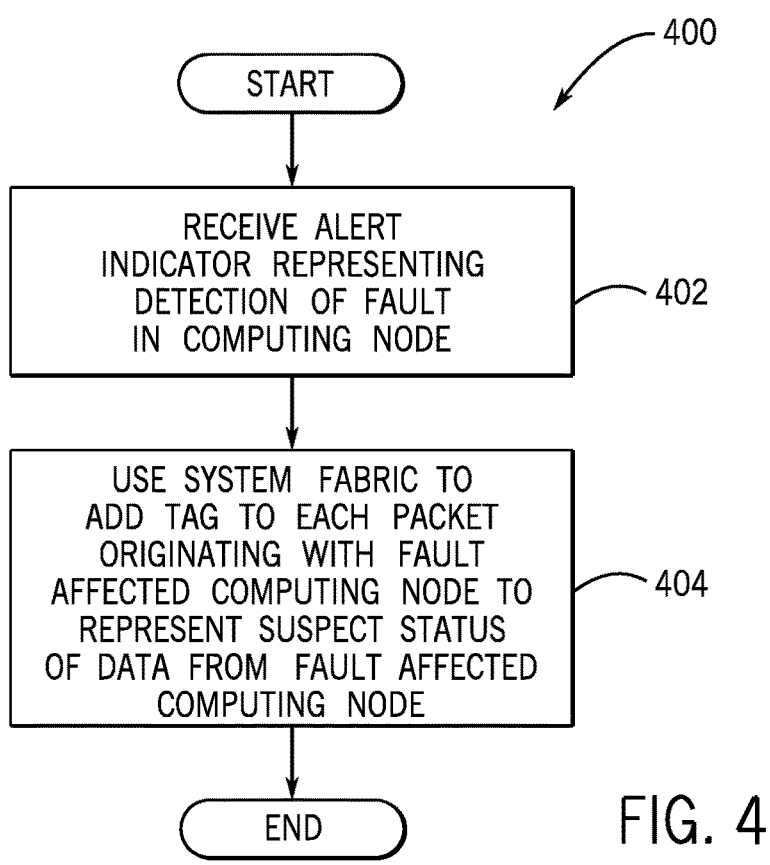

Referring to FIG. 4 in conjunction with FIG. 1, in accordance with further implementations, the cluster interconnection fabric 130 may be used to take another and/or an additional step for purposes of controlling the propagation of errors from an affected computing node 110 experiences a fault. In this manner, pursuant to a technique 400, an alert indicator is received (block 402) from the computing node 110 experiencing the fault, which indicates that the node has experienced a fault. In response to this alert indicator, the technique 400 includes using (block 404) the system fabric, such as the cluster interconnection fabric 130, to add a tag to each packet originating with the affected computing node to represent a "suspect status" of data from that node. In other words, a given computing node 110 other than the fault affected node receives a packet and this packet contains an indicator (or "tag"), which indicates a possible "suspect status," then the receiving computing node treats the packet with caution as the originating node has been identified as one that has experienced a fault. The tag may be added indicated by a given field (a given bit field, for example) in a header of the packet, in accordance with example implementations.

Figure 5:
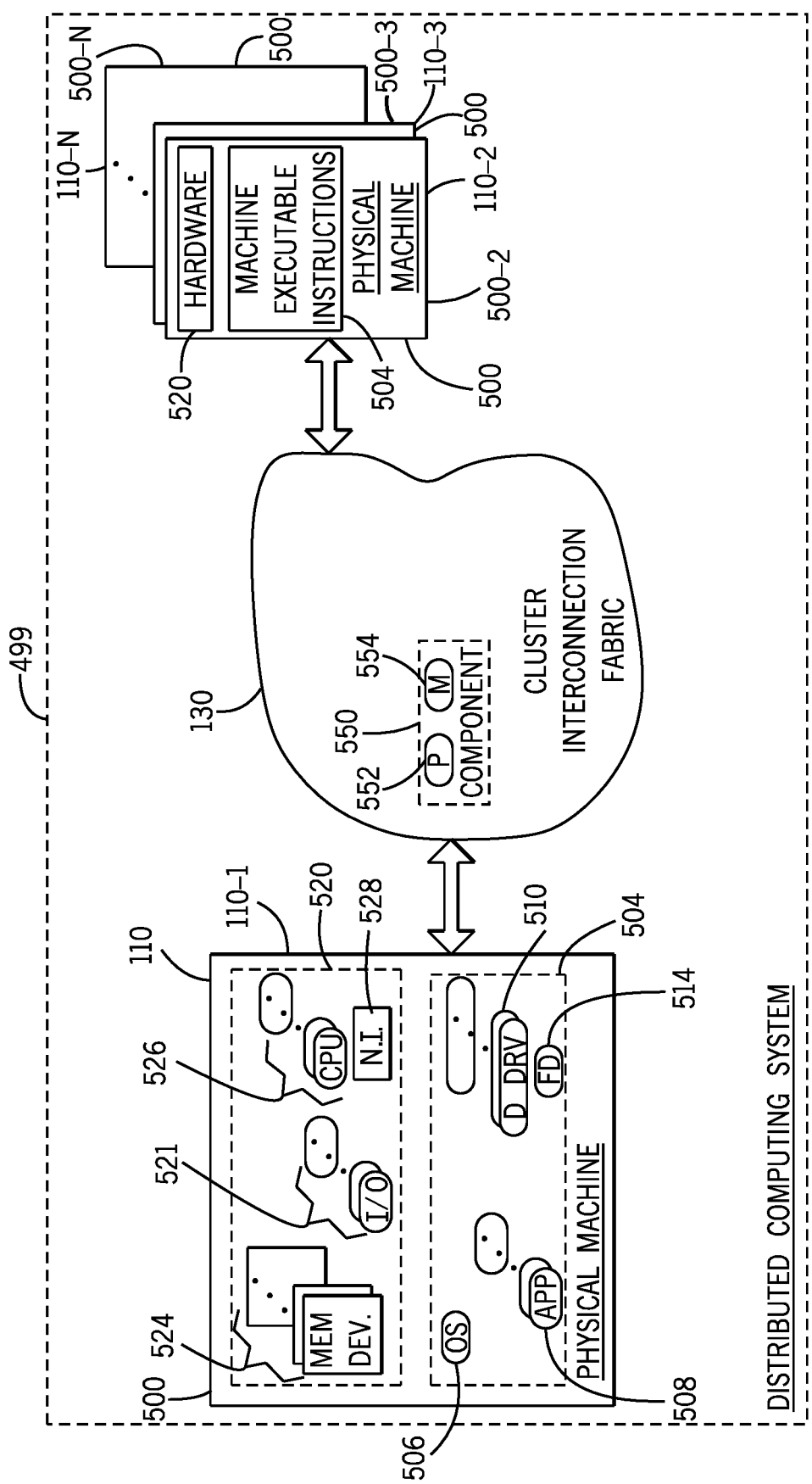
FIG. 5 is a more detailed schematic view of a distributed computing system according to an example implementation.

FIG. 5 depicts a more detailed representation of a distributed computing system 499 according to a further implementation. For this implementation, the distributed computing system 499 includes physical machines 500 (N physical machine 500-1, 500-2, 500-3 . . . 500-N being depicted as examples in FIG. 5) that form N respective computing nodes 110-1 to 110-N. The physical machine 500 is an actual machine that is made up of actual hardware and software.

In this regard, as illustrated by physical machine 500-1 (forming for this example computing node 110-1), the physical machine 500-1 includes machine executable instructions 504 that when executed by one or more central processing units (CPUs) 526, cause the CPU(s) 526 to form an operating system 506, one or multiple applications 508, a fault detector 514, one or more device drivers 510, and so forth. As an example, one of the applications may be a failure analysis application. The CPU(s) 526 is just one example of hardware 520 of the physical machine 500. In this regard, the physical machine 500 may include I/O adaptors 521, a network interface 528 and various memory devices 524.

In general, the memory devices 524 may be non-transitory storage devices, such as semiconductor storage devices, magnetic-based storage devices, optical storage devices, removable media, and so forth, depending on the particular implementation.

As also depicted in FIG. 5, the cluster interconnection fabric 130 may include various components, such as gateways, routers, switches, and so forth, for purposes of routing communication among the computing nodes 110. FIG. 5 illustrates an example component 550 (a switch, a gateway or an attachment point, as examples), which may include one or multiple processors 552, as well a memory 554 that stores instructions that when executed by the processor(s) 552, may cause the processor(s) 552 to perform one or more of the techniques that are disclosed herein on behalf of the fabric 130 for purposes of controlling the propagation errors from a computing node 110 that has experienced a fault and allowing access to the node 110 for purposes of failure analysis.

Figure 6:
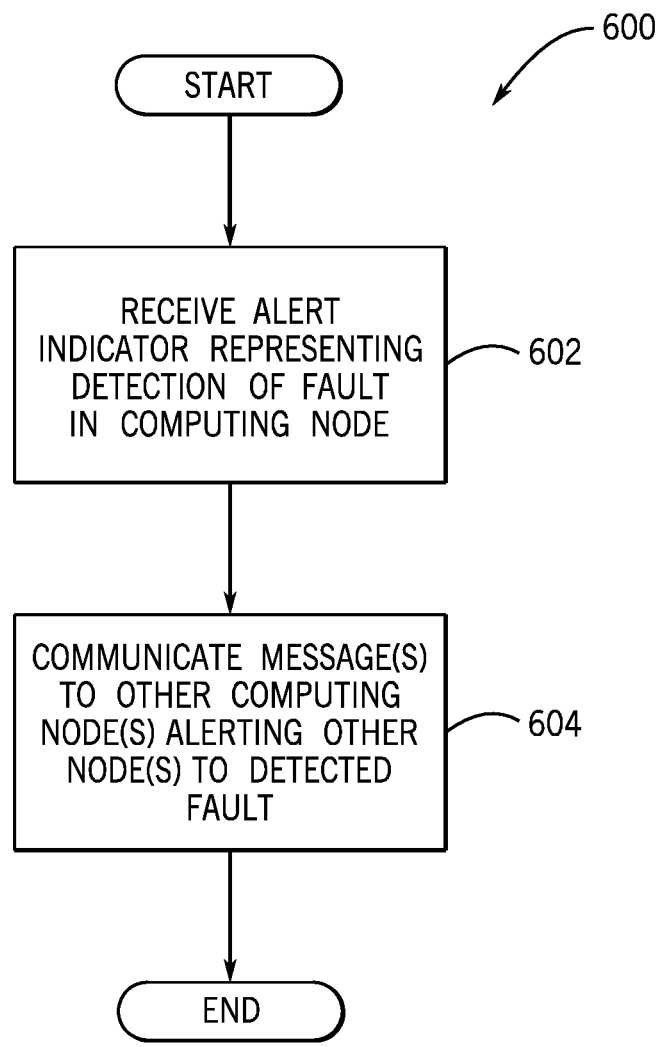
FIG. 6 is a flow diagram depicting a technique to use inter node communication to control error propagation in a distributed computing system due to a computing node fault according to an example implementation.

Other variations are contemplated, which are within the scope of the appended claims. For example, in accordance with further implementations, a technique 600 that is depicted in FIG. 6 may be used for purposes of using one or multiple components of the distributed computing system other than the fabric 130 for purposes of controlling the propagation of errors from a node that experiences a fault. In this manner, pursuant to block 602 of the technique 600, an alert indicator is received (block 602) representing the detection of a fault in a computing node. In response to the alert indicator, one or multiple messages are communicated (block 604) to one or multiple other computing nodes to alert the node(s) to the detected fault, pursuant to block 604. For example, in accordance with some implementations, the affected computing node experiencing the fault may generate the message(s) and communicate the message(s) to the other computing node(s). In further implementations, another computing node, other than the node experiencing the fault, may perform this task; and in further implementations, the system fabric may communicate such messages. Upon receipt of such a message by a given computing node, the node may flag all future transactions with the affected computing node for purposes of treating these transactions as being "suspect."

When a given computing node suffers a fault, the computing node may have a state in its processor caches, which correspond to remote memory provisioned to the computing node; and the computing node may have local memory. The states of this cached data, as well as the state of the local memory of the computing node may be preserved for analysis of the failure. It is noted that for this purpose, this data may be made visible to other computing nodes, given that the data is tagged with an indication of the data being corrupt.

For the write back data cached in a computing node's caches, the computing node, after having detected a fault, may attempt to flush its caches. Although this would normally involve writing back a modified cache line to remote memory, the interconnection fabric 130, having been apprised of the failure, may automatically tag these write back transactions with an indication that the data in these transactions is potentially corrupt. These tagged write back transactions may be saved in a remote memory, for example. As examples, depending on the particular implementation, the tagging of transactions may be performed by the computing node that experiences the fault or may be performed by the system fabric. In subsequent analysis, the remote memory that has been provisioned to the computing node experiencing the fault may be used, and the indication of potential corruption may be particularly helpful in that the data identifies areas of the remote memory which are cached in the computing node at the time of failure and hence, are likely to have been referenced recently before the fault.

For local memory on the computing node that experiences a fault, the computing node (or the system fabric 130 on behalf of the computing node) may initiate a copy operation of its local memory to a persistent place outside of the node. For this purpose, the system fabric, such as the cluster interconnection fabric 130, may be instructed to allocate some amount of unused remote memory to hold the data for this analysis purpose, or there may be special ports of remote memory reserved just for that purpose. Moreover, the cluster interconnection fabric 130 may allocate one or more of these. As the copy-out of local memory is performed, the fabric 130 may ensure that the copy-out is directed to the specifically allocated remote memory, thereby disallowing the computing node from copying out to another in-use memory, even memory that has been provisioned to the node. The cluster interconnection fabric 130 may further provide some kind of indication of where the local memory has been logged, for purposes of aiding in the analysis of the fault.

Figure 7:
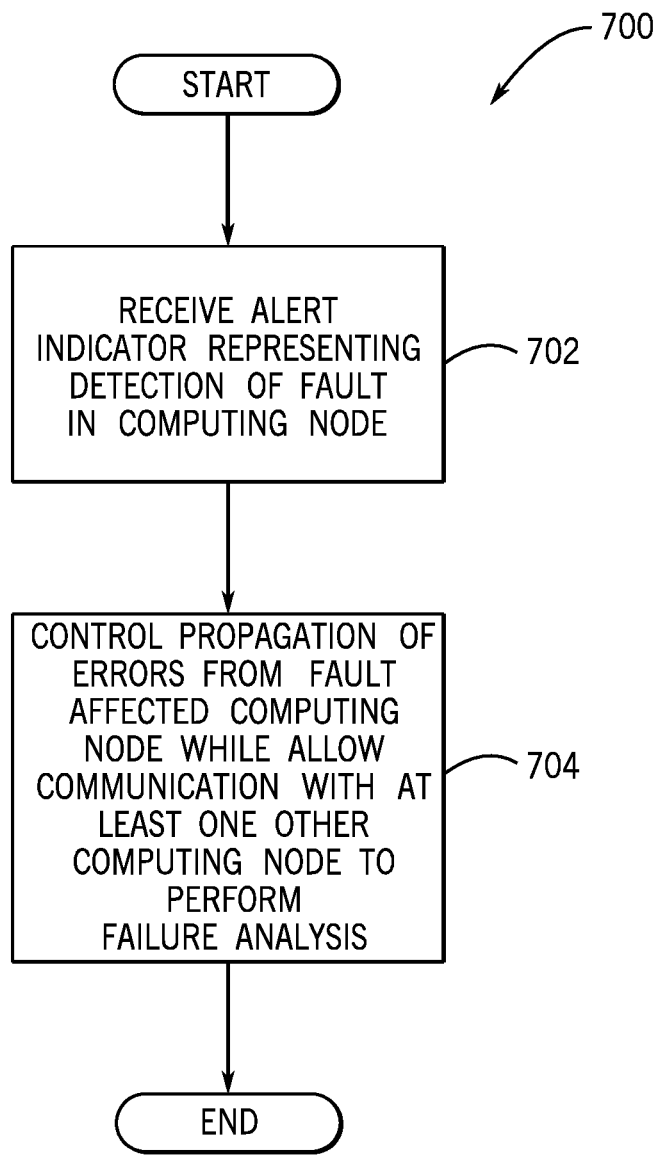
FIG. 7 is a flow diagram depicting a technique to control error propagation in a distributed computing system due to a computing node fault while allowing failure analysis of the node according to an example implementation.

Thus, referring to FIG. 7, in accordance with some implementations, a technique 700 includes receiving (block 702) an alert indicator representing the detection of the fault in a computing node and controlling (block 704) propagation of errors from the computing node while allowing communication with at least one other computing node to perform failure analysis.

In accordance with some implementations, the write back of cached data may alternatively be directed to an allocated remote memory for logging, rather than to the original remote memory that was assigned for this purpose. Again, the fabric 130 may perform this redirection on behalf of a computing node, to thereby not rely on the computing node's ability to correctly create a log of the failure without corrupting some other system. Using the "logging" of the remote memory for post fault saving of the state in the computing node may also have the advantage of allowing for analysis of what was in the remote memory before the failing computing node recently encached that data, as well as the corresponding state that was in the computing node's caches at the time of failure. Moreover, using separate "logging" remote memory for post fault savings of state may simplify the indication of which preserved state, post fault, is suspect.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
receiving an alert indicator in a distributed computer system comprising a plurality of computing nodes coupled together by cluster interconnection fabric, the alert indicator indicates detection of a fault in a first computing node of the plurality of computing nodes;
controlling error propagation from the fault of the first computing node in response to the alert indicator; and
while controlling error propagation, permitting the first computing node to communicate data associated with a state of the first computing node at the time of the fault to remote memory for failure analysis,
wherein the permitting the first computing node to communicate data includes a write back by the first computing node of cache data stored in the first computing node prior to or at the time of the fault, and tagging by the cluster interconnection fabric of the cache data being written back with an indication that the cache data is potentially corrupt to assist with failure analysis.

2. The method of claim 1, wherein the controlling error propagation includes the cluster interconnection fabric communicating commands to remote I/O adapters provisioned to the first computing node to halt I/O transactions with the first computing node.

3. The method of claim 1, wherein the permitting the first computing node to communicate data includes a copy-out by the first computing node of local memory of the first computing node prior to or at the time of the fault, and
the remote memory to which the data is communicated is to a portion of remote memory reserved by the cluster interconnection fabric specifically for failure analysis.

4. The method of claim 1, wherein the remote memory is accessed by special ports reserved by the cluster interconnection fabric for storing failure analysis data.

5. A system comprising:
a first computing node among a plurality of computing nodes, the first computing node to generate an alert indicator upon occurrence of a fault within the first computing node; and
a cluster interconnection fabric that couples together the plurality of computing nodes and the first computing node, the cluster interconnection fabric to respond to the alert indicator by regulating communication between the first computing node and others of the plurality of computing nodes to control error propagation from the fault of the first computing node,
wherein the regulating includes adding a tag to packets of the first computing node to represent a suspect status of the packets, and
the regulating includes permitting the first computing node to copy-out data from local memory representing a state of the first computing node at the time of the fault to a remote memory.

6. The system of claim 5, wherein the regulating communication by the cluster interconnection fabric prevents others of the plurality of computing nodes from reading corrupted memory content of the first computing node.

7. The system of claim 5, wherein the cluster interconnection fabric is to reserve special ports for accessing the remote memory for copy-out operations of local data by the first computing node for failure analysis data.

8. The system of claim 5, wherein the cluster interconnection fabric, in regulating communication to respond to the alert indicator, prohibits the first computing node from encaching new portions of remote memory.

9. The system of claim 5, wherein the cluster interconnection fabric, in regulating communication to respond to the alert indicator, prohibits the first computing node from provisioning additional memory.

10. The system of claim 5, wherein the cluster interconnection fabric, in regulating communication to respond to the alert indicator, prohibits the first computing node from provisioning additional I/O resources.

11. A non-transitory machine readable medium comprising instructions executed by a processor, the machine readable medium comprising:
instructions to receive an alert indicator in a distributed computer system comprising a plurality of computing nodes coupled together by cluster interconnection fabric, the alert indicator indicating detection of a fault in a first computing node of the plurality of computing nodes; and
instructions to regulate communication between the first computing node and others of the plurality of computing nodes in response to the alert indicator to contain error propagation due to the fault within the first computing node,
wherein the instructions to regulate communication includes:
instructions to add a tag to packets of the first computing node to represent a suspect status of the packets, and
instructions to prohibit the first computing node from encaching new portions of remote memory, instructions to prohibit the first computing node from provisioning additional memory, or instructions to prohibit the first computing node from provisioning additional I/O resources.

12. The non-transitory machine readable medium of claim 11, wherein the instructions to regulate communication includes:
instructions to allow the first computing node to write back cache data stored in the first computing node prior to or at the time of the fault to remote memory for failure analysis,
instructions to allow the first computing node to copy-out data from local memory representing a state of the first computing node at the time of the fault to a remote memory, and
instructions to tag the cache data being written back with an indication that the cache data is potentially corrupt to assist with the failure analysis.

13. The non-transitory machine readable medium of claim 11, wherein the instructions to add a tag to packets of the first computing node to represent a suspect status of the packets are executed by a processor of a computing node of the plurality of computing nodes.

14. The non-transitory machine readable medium of claim 11, wherein the instructions to regulate communication includes instructions to prevent others of the plurality of computing nodes from reading corrupted memory content of the first computing node.

15. The non-transitory machine readable medium of claim 11, wherein the instructions to regulate communication includes instructions to communicate commands to remote I/O adapters provisioned to the first computing node to halt I/O transactions with the first computing node.

16. The system of claim 5, wherein the regulating, by the cluster interconnection fabric, includes permitting the first computing node to communicate data includes a write back by the first computing node of cache data stored in the first computing node prior to or at the time of the fault, and tagging by the cluster interconnection fabric of the cache data being written back with an indication that the cache data is potentially corrupt to assist with failure analysis.

17. The method of claim 1, further comprising prohibiting, by the cluster interconnection fabric and in response to the alert indicator, the first computing node from encaching new portions of remote memory.

18. The method of claim 1, further comprising prohibiting, by the cluster interconnection fabric and in response to the alert indicator, the first computing node from provisioning additional memory.

19. The system of claim 5, further comprising prohibiting, by the cluster interconnection fabric and in response to the alert indicator, the first computing node from provisioning additional I/O resources.

* * * * *